Dec. 27, 1966     E. NIEMEYER ETAL     3,294,025
ELECTRIC CENTRIFUGAL IN-THE-TANK PUMP
Filed Aug. 6, 1965     2 Sheets-Sheet 1

INVENTORS
EDGAR NIEMEYER
CHARLES W. JEEP, JR.
BY Robert B. Burns
ATTORNEY

Dec. 27, 1966  E. NIEMEYER ETAL  3,294,025
ELECTRIC CENTRIFUGAL IN-THE-TANK PUMP
Filed Aug. 6, 1965  2 Sheets-Sheet 2

INVENTORS
EDGAR NIEMEYER
CHARLES W. JEEP, JR.

BY Robert B. Burns

ATTORNEY 3,294,025
ELECTRIC CENTRIFUGAL IN-THE-TANK PUMP
Edgar Niemeyer, Normandy, and Charles W. Jeep, Jr., Webster Groves, Mo., assignors to ACF Industries Incorporated, New York, N.Y., a corporation of New Jersey
Filed Aug. 6, 1965, Ser. No. 477,865
11 Claims. (Cl. 103—87)

This invention relates to a submergible liquid transfer device and in particular to a motor-driven centrifugal fuel pump for use in a fuel tank or similar storage receptacle.

Automotive fuel systems normally require that fuel be furnished from a source such as a tank carried on the vehicle, to the engine carburetor for providing an air-fuel combustible mixture. As a matter of expediency, the fuel pump is normally carried on or near the engine, and often drivingly coupled to the latter so as to operate in response to engine speed.

In an instance where the fuel tank is carried at the rear of the vehicle and the motor at the front, the fuel line extending therebetween can be lengthy. Thus, with the fuel pump positioned near the engine, an inherent operational defect frequently encountered is vapor lock due to excessive heating in the fuel line and/or the pump. A fuel pump of the type herein contemplated is shown in our corresponding patent application Serial Number 438,336, filed March 9, 1965.

It is therefore an object of the invention to provide an improved motor driven submergible pump.

Another object is to provide a self contained liquid transfer device for an automotive fuel system. A still further object is to provide a novel motor driven centrifugal pump for use in an automotive fuel tank in which a portion of the fuel pumped functions to cool motor parts. Another object is to provide an easily assembled motor driven pump to facilitate holding the pump and the motor casing into a unitary component.

A still further object is to provide a submergible, motor driven pump characterized by a simple structure enclosing the operating members within a liquid cooled casing.

These and other objects of the invention will be clear to those skilled in the art from the accompanying description of the invention made with reference to the drawings.

Figure 1:
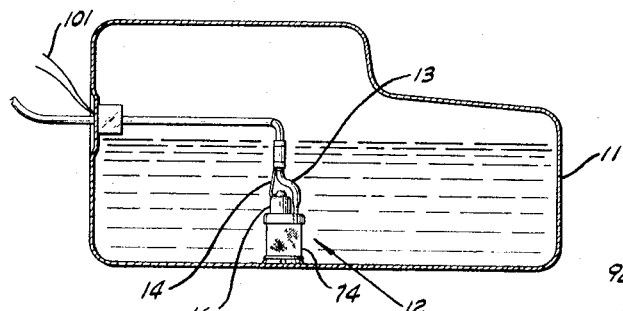

Referring to FIGURE 1 the novel submergible pump unit 12 is shown within an automobile fuel tank 11.

Pump 12 is supportably positioned on the floor of the tank, an elongated conduit 13 connected to the pump discharge delivers a flow of fuel from tank 11 to the engine carburetor. Conduit 13 is supported by a bracket 14 which also supports electric drive motor 16.

Figure 2:
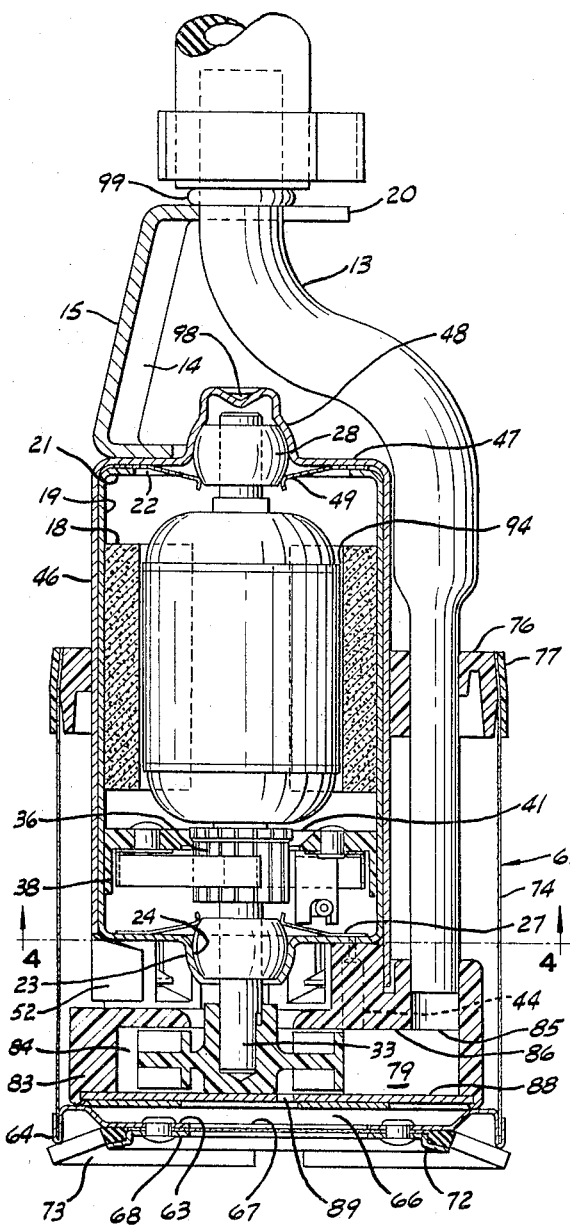
Figure 3:
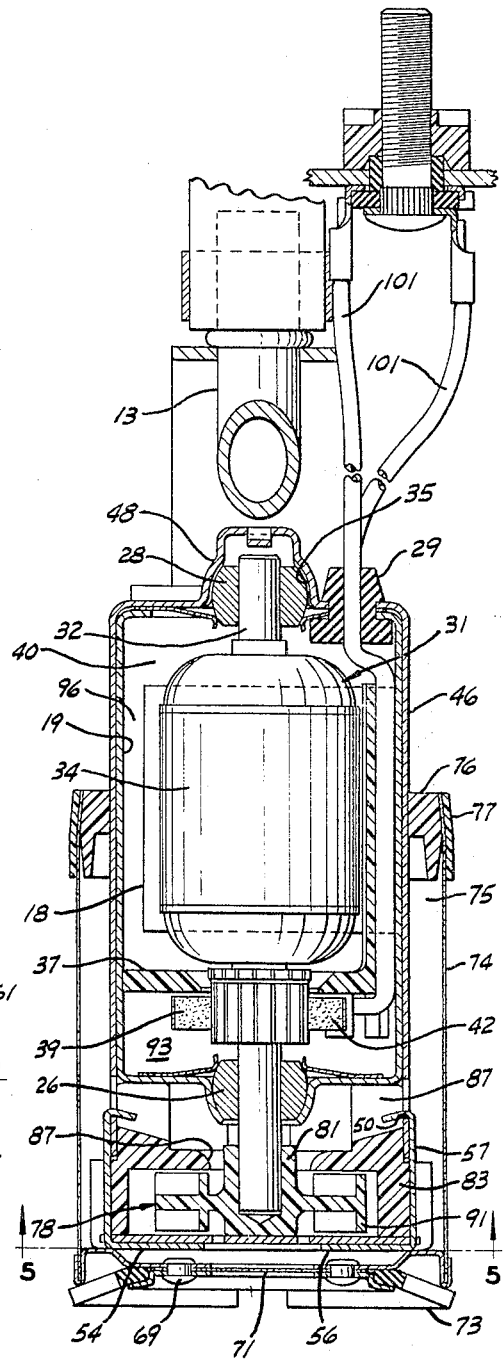

Referring to FIGURES 2 and 3, the novel apparatus embodying the invention includes basically a centrifugal pump 12 operably coupled to a high speed motor 16. A filter element 74 substantially surrounds the pump and a portion of the motor for eliminating small solids which might otherwise enter the pump suction and be carried to the carburetor. Passage means is further provided in the pump casing for directing a minor portion of the liquid flow into the motor casing, the latter being provided with an egress such that liquid is circulated through the motor for cooling purposes. A radially assembled casing includes a pair of telescopically engaged cylindrical casings securely aligned and locked into a journaled enclosure.

Referring to FIGURES 2 and 3 the drive motor portion of the device includes a high rotational speed unit designed to operate at approximately 10,000 r.p.m., and electrically connected to an automotive (6 or 12 volt D.C. battery) system.

Drive motor 16 includes a segmented stator 18 positioned within elongated cylindrical motor casing 19; forming a central opening and elongated spaced passages. Casing 19 is provided with an upper end wall 21 having an aperture 22 formed therein. The opposite end of casing 19 includes a second, lower end wall or bell housing 23 having a bearing well 24 formed therein to receive bearing 26. A plurality of spring retainers 27, or alternately a single retainer ring, having extending arms, is fastened to the inner surface of end wall 21 with the resilient arms normally urging bearing 26 into seating engagement with well 24.

A second bearing 28 is similarly positioned at the opposite end of motor casing 19 as will be hereinafter noted in greater detail.

Motor armature 31 is journaled centrally of casing 19: shaft 32 is terminally supported within the respective bearings 26 and 28, having one shaft end 33 overhanging the bearing 26. The shaft includes a wound rotor 34 which is coaxially spaced within the stator segments 18. A segmented commutator 36 carried on the shaft adjacent the end of rotor 34, is connected to the rotor windings in a well known manner. A panel 37 positioned within motor casing 19 includes a peripheral rim 38 depending from a transverse wall, the latter having a central opening 41 in registry with commutator 36. A plurality of brush assemblies 39 and 42 are mounted on panel 37 and include resilient brush members urged into electrical contact with the commutator segments as the latter rotates.

The lower end wall of motor casing 19 includes an opening for admitting a pressurized stream of pumped liquid from passage 44 communicated with the discharge side of the pump volute upstream of the pump discharge opening, for contacting and cooling motor parts.

The outer surface of motor casing 19 is provided with a close fitting cylindrical shell 46 which is telescopically received on elongated casing 19. Shell 46 comprises preferably an elongated sheet metal member having an upper wall 47 including well housing 48, which wall 47 includes a spring retainer 49 for positioning the bearing in place. Shell 46 is further provided with a liquid discharge passage, preferably grooves 35 formed in the wall of bearing well 48 to permit discharge of cooling liquid after the latter has passed into contact with motor parts.

To promote free passage of cooling liquid from the motor upper chamber, bearing 28 may be provided with one or more longitudinally extending passages which communicate the shell casing with the inner portion of bearing well 48. Thus, normal circulation of liquid will carry the latter through respective bearing passages into the bearing well, and thereafter discharge into the fuel tank.

Referring to FIGURES 2 and 3, 4 and 5 the lower end of shell 46 includes peripherally spaced openings 51 having a lower lip 50. Two or more inwardly deflectable lock tabs 52 are formed at the wall of the shell 46 intermediate openings 51, said tabs being stamped or otherwise shaped from the shell with an upright hinged edge. The upper surface of each tab 52 is beveled toward the tab free end when shell 46 and casing 19 are in normal engagement. Thus, lock tabs 52 are inwardly bent about the upright hinged edge such that the tab upper surface is in abutting engagement with the casing lower wall to urge the latter into tight engagement with the shell 46 and avoid relative movement therebetween.

Figure 7:
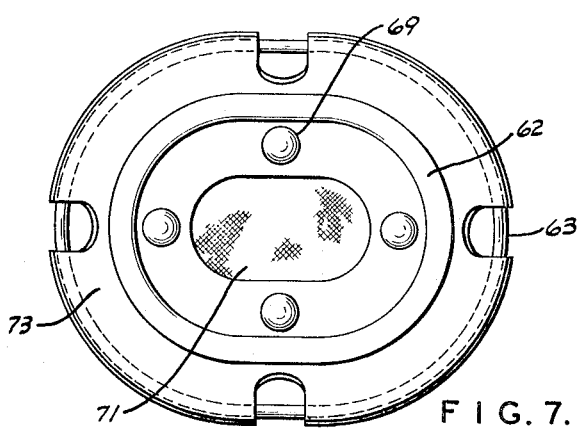

Referring again to FIGURES 2, 3, and 7, filter assembly 61 is carried on the motor and pump to substantially surround the lower portion of shell 46; and both pump suction inlets. Said filter assembly includes a base member having an upper plate 63; peripherally terminated at an up-turned rim 64 which normally abuts the lower surface of pump 12. Plate 63 is spaced from the pump to provide a chamber 66 therebetween.

A central opening 67, or preferably a plurality of openings in upper plate 63, permits passage of liquid from the fuel tank to enter the pump suction particularly at low fuel levels. Upper plate 63 is formed at rim 64 to define a sealable peripheral lip adapted to receive the lower edge of elongated screen filter element 74. A lower plate 68 is engaged with upper plate 63 by one or more rivets 69 or similar fastening means clamping said respective plates to a screen member 71 held therebetween. Lower plate 68 includes a downturned peripheral flange 72 forming an opening with the underside of upper plate 63, in which opening a spring member 73 is held.

Spring member 73 includes a circular washer like element or non-metallic member, so formed to be tightly held in flange 72 and provide a shock or vibration base for the unit. Although member 73 is presently shown as a washer like device, it is understood that a similar shock absorbing means may likewise be carried on the plate assembly to achieve the purpose.

Figure 5:
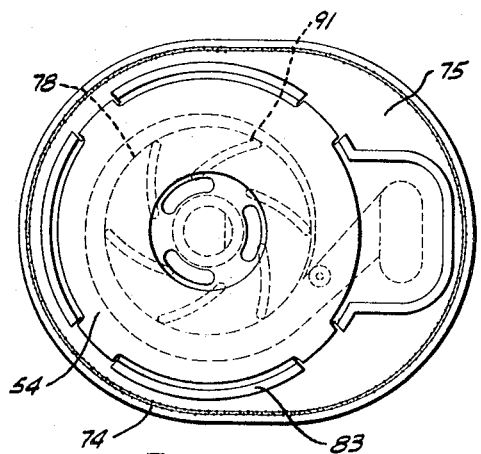

Filter element 74, as shown in FIGURE 5, is generally elongated, comprising an oval shaped screen having a fine mesh in the order of magnitude of about 625 openings per inch. As mentioned, the lower edge of the filter element 74 is crimped or otherwise fastened to the upper plate rim 64, to provide a liquid seal. Element 74 is sufficiently large to define an anular chamber 75 about shell 46.

The upper edge of filter element 74 extends along, and terminates approximately at the center of the shell 46 such that fuel entering suction inlet 87 will pass through the screen element, thereby blocking impurities and other solid matter. A locking means includes a positioning ring 76 surrounding shell 46 and forms a substantially liquid tight annular seal with the shell outer surface, and also with discharge conduit 13. The upper surface of positioning ring 76 is flared slightly to receive the filter element 74 and to receive a clamp ring 77. The latter slidably the upper edge of the filter screen to urge the screen into a liquid tight joint.

Filter assembly 61 will normally pass fuel and avoid entry of foreign material into the pump. Under some circumstances however, and particularly in the instance of the present high speed centrifugal pump, there will be a decided tendency to accumulate air or gas bubbles in the annulus 75 between the filter and shell 46. To preclude excessive vapor build-up, it is necessary to vent such vapors from the annulus and concurrently prohibit entry of unfiltered fuel into the pump section.

Figure 6:
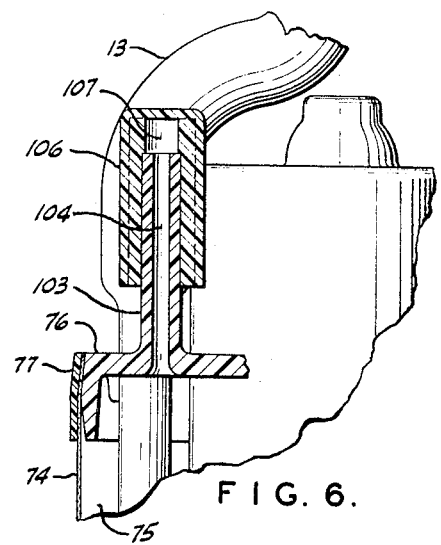

Referring to FIGURE 6, vent tube 103 is provided in positioning ring 76, and includes a vent passage 104 which functions also as a vapor trap. An elevated cap 106 is rigidly held on vent tube 103 and forms an annular passage intermediate the tube and the cap inner wall. A cross passage 107 communicates the vent passage with the outer annular passage, thus, completing the vapor trap configuration.

Normally as vapors accumulate within annulus 75, a gradual pressure build-up will prohibit entry of fuel directly through vent passage 104, even though the fuel tank is filled to maximum capacity and exerts a maximum head of pressure. Thereafter, as the amount of fuel in the tank is decreased and the level falls below the vent opening, gas accumulations from the annulus will be passed directly into the fuel tank.

Pump 12 is connected to shell 46 and to the overhung end 33 of shaft 32 to form an elongated coaxial unit. Pump 12 includes a generally circular casing 83 conforming in general to the configuration of the shell 46 and, having a lobe depending from one side, in which a discharge opening 85 is formed. Casing 83 may be formed of a cast metal structure, preferably however, it is molded of a plastic, thermo-setting material, corrosion resistant to the liquid being pumped. Casing 83 includes an internal cavity 84 forming a volute, having an upper wall 86 in which inlet opening 87 is formed.

The lower wall of cavity 84 is defined by a metallic plate 88 received in an internal recess in the lower face of the casing 83. Openings 89 in plate 88, being slightly offset from the volute center, provides a secondary inlet for introducing liquid to the pump cavity 84.

The pump cavity 84, and pump structure in general are well known in the centrifugal pumps art, which structure includes the volute formed in cavity 84 for receiving an impeller 78; the volute being communicated with discharge passage 79 and discharge opening 85.

Impeller 78, which may also be molded of a thermosetting plastic material includes a central hub 81 about body 58, formed with a grooved opening 82, the lower hub bears against the upper bearing surface of plate 88. A plurality of outwardly radiating vanes 91 are carried at either side of the impeller such that rotation of the latter under normal operating conditions will deliver a pressurized stream of liquid through the discharge passage 79 into the discharge opening 85, and thence into conduit 13.

The upper wall 86 of pump 12 includes a generally circular projection 92 having a plurality of upright slots defining a castellated hub. The latter is slidably received for assembly in the lower open end of the cylindrical shell 46.

Figure 4:
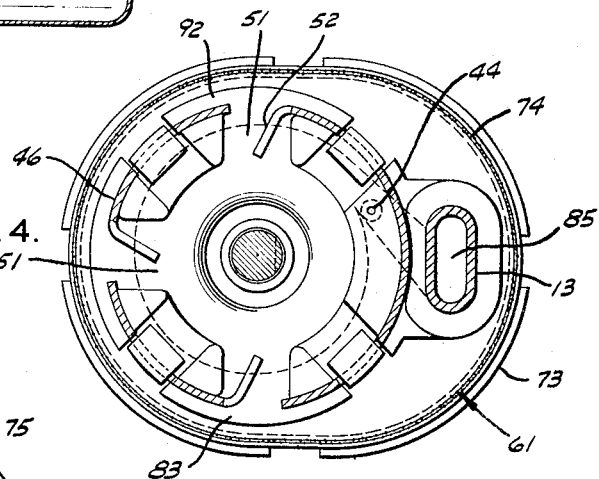

Openings 51 are positioned in substantial horizontal alignment with lock tabs 52 on the shell 46. As shown in FIGURES 2, 3, and 4, pump 12 is readily assembled with shell 46 by inserting the pump circular projection 92 into shell 46 until the casing upper face is in abutment with the lower wall of motor casing 19. The respective lock tabs 52 are then inwardly bent or deflected through the slots 51 such that the upper beveled surface of tabs 52 engage the lower surface of the casing 19. Thus, casing 19 is urged telescopically into the shell 46, to make a tight fit, the two thereby forming a rigid unit.

A retainer 54 is carried at the lower surface of pump casing 83 holding plate 88 in tight engagement with the casing. Retainer 54 includes a central portion 56 having a plurality of outwardly radiating and upwardly extending fingers 57 which embrace the wall of the pump casing 83, and in the unbent condition extend across the peripheral openings 51 in shell 46.

In assembling the shell 46 to the casing 83, fingers 57 are bent inwardly for insertion into openings 51 to engage lip 50 and thereby draw shell 46 downwardly to hold the casing 83 upper wall 86 in abutting engagement with the shell.

Lower wall 88 of the casing 83 is provided with an opening or openings 89 communicating with the volute discharge passage 79. Passage 79 functions as a bypass means and delivers a flow of liquid through opening 44 to the motor lower chamber 93. Thus, during normal high speed operation of the pump, a continuous stream of pumped liquid is delivered from the downstream side of the volute, into the motor chamber 93, along the annulus 94 formed between rotor 34 and stator 18, or through passages 96 intermediate the stator segments, and into the motor upper chamber 40. Thereafter the pumped fluid is discharged through one or more openings, such as opening 98 formed at the motor upper end in the bearing well 48.

The motor will thus normally be provided with a continuous circulation of cooling liquid to contact and cool motor parts. At such times when the level of liquid in fuel tank 11 falls below the pump, normal suction inlet 87 liquid will be drawn through the lower openings 89 in wall 88 to enter the volute.

The upper end of the shell 46 is provided with suitably formed bracket 14 which, as shown in FIGURES 2 and 3 includes an upright portion 15 terminating in a support arm 20 having a grooved opening, positioning ring 76 slidably receives an intermediate portion of conduit 13 to form a substantially fluid tight annular seal therewith. The conduit upper end is bent into substantially coaxial alignment with the motor axis and registers in support arm 20. Conduit 13 may be provided with an annular locating collar 99 positioned contiguous with the upper wall of arm 20. The conduit 13 is further provided with an upper receiving end which may be connected to suitable clamping means for conducting liquid to the point of use.

The pump drive motor 16 is connected to a source of current which may be either A.C. or D.C. in accordance with the application. For automotive use, a common electrical source would be 6 or 12 volt D.C., the source for operating the automobile ignition system. As shown in FIGURES 2 and 3, the motor is electrically connected through lead wires 101 to the respective brush assemblies 39 and 42 within the motor casing. Leads 101 are directed intermediate the stator segments toward the motor upper chamber.

A grommet 29 or similar seal device carried in shell 46 and motor casing 19, forms a liquid tight seal therewith. Leads 101 are passed through the sealing grommet 29 and are of sufficient length to electrically connect the motor to a current source external of tank 11.

We claim:

1. The combination in a submergible liquid transfer device including a motor having an elongated cylindrical housing defining an opening at one end, a centrifugal pump housing connected to said opening at said one end of said cylindrical housing, said centrifugal pump including a volute having inlet and discharge ports, an impeller rotatably mounted in the casing and being co-operative with said volute to form a pumping chamber, a shaft depending from said motor and drivingly coupled to said impeller for rotating the latter to pump liquid through said discharge port, conduit means communicated with said pump outlet port for carrying liquid therefrom, a filter assembly substantially surrounding at least a portion of said elongated cylindrical housing and said pump casing, respectively, said filter assembly including a base member supportably positioned at the lower side of said pump casing, a resilient member depending from said base member to engage a wall in a liquid holding reservoir for insulating said transfer device from vibrations during operation thereof, a screen carried on said base member and extending adjacent to said cylindrical housing and to said casing and being spaced slightly apart to form an annulus and, a collar engaging the upper end of said housing forming therewith and with said conduit means respectively a substantially liquid tight seal at said cylindrical housing to preclude entry of liquid into said pump inlet means other than by way of said screen.

2. In a device substantially as defined in claim 1 wherein said resilient member in said filter assembly includes at least one spring device carried at the underside of said base member.

3. A combination defined in claim 1 wherein said collar including an inner surface disposed contiguous with the outer surface of said housing, and a tapered external surface adapted to receive the upper edge of said screen, a locking means carried on said collar and holding said screen in position against said tapered external surface.

4. A combination as defined in claim 1 wherein said collar including an inner surface disposed contiguous with the outer surface of the housing and a tapered external surface having a beveled portion therein, and a locking ring having an inner tapered surface slidably received on said outer surface and engaging said beveled portion for wedging said screen in position.

5. A combination as defined in claim 1 wherein said collar includes passage means formed therein and communicated with said annulus for venting gas from the latter.

6. A combination as defined in claim 5 wherein said venting means including a plurality of passages communicated with said annulus and being intercommunicated to define a trap for holding gas and preventing entry of liquid into said annulus by way of said vent pipe.

7. A structure for an elongated submergible pump including a motor having a drive shaft, a centrifugal pump having an impeller and being coupled to said drive shaft to be rotated thereby, said pump including a casing, a volute formed in the casing and enclosing said impeller, said volute having suction and discharge ports communicated therewith, a hub projecting from said pump casing and including an opening therein communicated with said suction port, an elongated housing enclosing said motor and being in substantially co-axial alignment with said pump casing, said housing being received on said casing hub and including a lateral opening therein communicated with said suction opening for directing liquid to said volute, and fastening means carried on said pump casing and extending externally thereof toward said motor housing, said fastening means engaging the elongated housing in said opening and rigidly holding said housing and casing respectively.

8. In a structure substantially as defined in claim 7 including an open side in said volute and a cover plate removably carried on said casing at said open side forming a wall to said volute.

9. In a structure as defined in claim 8 wherein said fastening means engages said plate to hold the latter in engagement with said casing.

10. In a structure as defined in claim 7 wherein said fastening means includes said base plate being positioned at the casing wall, a plurality of fingers depending from said base plate and extending adjacent to the pump casing in a direction toward said housing for engaging the latter.

11. In a structure as defined in claim 8 wherein said cover includes means therein forming an opening in communication with said volute to provide a second suction opening to the latter.

References Cited by the Examiner
UNITED STATES PATENTS

| | | | |
|---|---|---|---|
| 2,803,384 | 8/1957 | Karte et al. | |
| 2,969,741 | 1/1961 | Wright et al. | 103—87 |
| 3,090,318 | 5/1963 | Jeep et al. | 103—87 |

ROBERT M. WALKER, *Primary Examiner.*